(12) United States Patent
Sommerfeld et al.

(10) Patent No.: US 8,399,797 B2
(45) Date of Patent: Mar. 19, 2013

(54) AUTOMATIC COMPRESSOR ADJUSTMENT SYSTEM AND METHOD FOR A PORTABLE CUTTING TORCH SYSTEM

(75) Inventors: Troy A. Sommerfeld, Neenah, WI (US); Nathan Gerald Leiteritz, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1351 days.

(21) Appl. No.: 12/116,925

(22) Filed: May 7, 2008

(65) Prior Publication Data
US 2009/0159576 A1 Jun. 25, 2009

Related U.S. Application Data

(60) Provisional application No. 61/015,133, filed on Dec. 19, 2007.

(51) Int. Cl.
*B23K 10/00* (2006.01)

(52) U.S. Cl. ......... 219/121.54; 219/121.39; 219/121.48; 417/252

(58) Field of Classification Search .............. 219/121.39, 219/121.44, 121.45, 121.54, 121.55, 121.57; 417/250, 252
See application file for complete search history.

(56) References Cited

U.S. PATENT DOCUMENTS

| | | | |
|---|---|---|---|
| 2,410,522 A | 11/1946 | Powell | |
| 2,423,677 A | 7/1947 | Balogh | |
| 4,410,788 A | 10/1983 | Summers et al. | |
| 4,918,285 A | 4/1990 | Thommes | |
| 4,943,699 A | 7/1990 | Thommes | |
| 5,086,205 A | 2/1992 | Thommes | |
| 5,222,356 A * | 6/1993 | Evenson et al. ................. 60/773 |
| 5,362,207 A | 11/1994 | Martin et al. | |
| 5,541,857 A | 7/1996 | Walter et al. | |
| 5,681,368 A | 10/1997 | Rahimzadeh | |
| 6,130,398 A | 10/2000 | Schneider et al. | |
| 6,158,416 A * | 12/2000 | Chen et al. .................... 123/380 |
| 6,220,045 B1 | 4/2001 | Kim et al. | |
| 6,220,245 B1 | 4/2001 | Takabayashi et al. | |
| 6,313,431 B1 | 11/2001 | Schneider et al. | |
| 6,638,029 B2 * | 10/2003 | Kharsa .......................... 417/250 |
| 6,785,980 B1 | 9/2004 | Koelzer | |
| 6,832,900 B2 | 12/2004 | Leu | |
| 6,931,850 B2 * | 8/2005 | Frank et al. ..................... 60/608 |

(Continued)

FOREIGN PATENT DOCUMENTS

| EP | 1082992 A | 3/2001 |
|---|---|---|
| GB | 631194 A | 10/1949 |

(Continued)

OTHER PUBLICATIONS

U.S. Appl. No. 11/960,425, filed Dec. 19, 2007, Salsich.

(Continued)

*Primary Examiner* — Mark Paschall
(74) *Attorney, Agent, or Firm* — Fletcher Yoder P.C.

(57) ABSTRACT

A system is provided that includes a torch power unit that includes a compressor and a controller configured to adjust output of the compressor in response to feedback comprising compressor output, or altitude, or atmospheric pressure, or a combination thereof. A method is provided that includes adjusting operational parameters of a torch power unit to account for environmental conditions affecting performance of the torch power unit. A method of manufacturing a portable cutting torch system is also provided. Another system is provided that includes a plasma cutting circuit, a compressor, a motor coupled to the compressor, an interface, and an environmental feedback controller.

22 Claims, 4 Drawing Sheets

U.S. PATENT DOCUMENTS

| | | |
|---|---|---|
| 6,989,509 B2 | 1/2006 | Silvestro |
| 7,022,935 B1 | 4/2006 | Matus et al. |
| 7,322,202 B2 * | 1/2008 | Zywiak et al. .................... 62/86 |
| 8,203,096 B2 * | 6/2012 | Sanders et al. ........... 219/121.48 |
| 2001/0042736 A1 | 11/2001 | Schneider et al. |
| 2003/0042237 A1 | 3/2003 | Brofft et al. |
| 2004/0003853 A1 | 1/2004 | Bankstahl et al. |
| 2005/0109738 A1 | 5/2005 | Hewett et al. |
| 2005/0155959 A1 | 7/2005 | Bender et al. |
| 2005/0201868 A1 | 9/2005 | Gao et al. |
| 2008/0023449 A1 | 1/2008 | Salsich et al. |
| 2008/0023451 A1 | 1/2008 | Salsich et al. |
| 2008/0149602 A1 | 6/2008 | Lenzner et al. |

FOREIGN PATENT DOCUMENTS

| | | |
|---|---|---|
| JP | 56052598 A | 5/1981 |
| WO | 2007/113389 A | 10/2007 |

OTHER PUBLICATIONS

U.S. Appl. No. 11/960,494, filed Dec. 19, 2007, Salsich.
U.S. Appl. No. 11/960,514, filed Dec. 19, 2007, Salsich et al.
Millerwelds; Owner's Manual entitled "Spectrum 125C and ICE-12C Torch;" www.millerwelds.com/om/o2248e_mil.pdf; 32 pages.
Millerwelds; Article entitled "Spectrum 125C—The Power of Blue;" issued Mar. 2007; Index No. PC/13.0; www.millerselds.com/pdf/spec_sheets/PC13-0.pdf; 4 pages.

* cited by examiner

AUTOMATIC COMPRESSOR ADJUSTMENT SYSTEM AND METHOD FOR A PORTABLE CUTTING TORCH SYSTEM

CROSS REFERENCE TO RELATED APPLICATIONS

This application claims priority to and the benefit of U.S. Provisional Application No. 61/015,133, entitled "Automatic Compressor Adjustment System and Method for a Portable Cutting Torch System," filed Dec. 19, 2007, the disclosure of which is incorporated herein by reference.

BACKGROUND

The invention relates generally to metal cutting and welding torches and, more particularly, to plasma cutting systems.

A plasma cutting system creates plasma (e.g., high temperature ionized gas) to cut metal or other electrically conductive material. In general, an electrical arc converts a gas (e.g., compressed air) into plasma, which is sufficiently hot to melt the work piece while the pressure of the gas blows away the molten metal. The power output and flow of the gas can affect the performance of the system. Moreover, environmental conditions can affect the performance of the system. Unfortunately, existing systems do not account for variations in environmental conditions.

In some instances, the environmental conditions may include a high altitude and a low atmospheric pressure. In these environmental conditions, the plasma cutting systems may not have sufficiently high output flow and pressure of compressed air due to the relatively low inlet pressure, i.e., low atmospheric pressure. As a result, the reduction in pressure and flow of the air may cause the torch to overheat, cut slower or generally at unacceptable rates, and blow away the molten metal less effectively than desirable for the particular application.

BRIEF DESCRIPTION

In one embodiment, a torch power system is provided that includes a compressor and a controller configured to adjust output of the compressor in response to feedback comprising compressor output, or altitude, or atmospheric pressure, or a combination thereof.

A method is provided adjusting operational parameters of a torch power unit to account for environmental conditions affecting performance of the torch power unit. Code implementing the method disposed on a machine readable medium is also provided.

In another embodiment, a system is provided that includes a torch power unit. The torch power unit includes a plasma cutting circuit, a compressor, a motor coupled to the compressor, and an interface that includes a plasma torch connection. The interface is coupled to the plasma cutting circuit, the compressor, and an environmental feedback controller configured to adjust power output, or compressor output, or a combination thereof, to levels effective to generate plasma in different environmental conditions.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
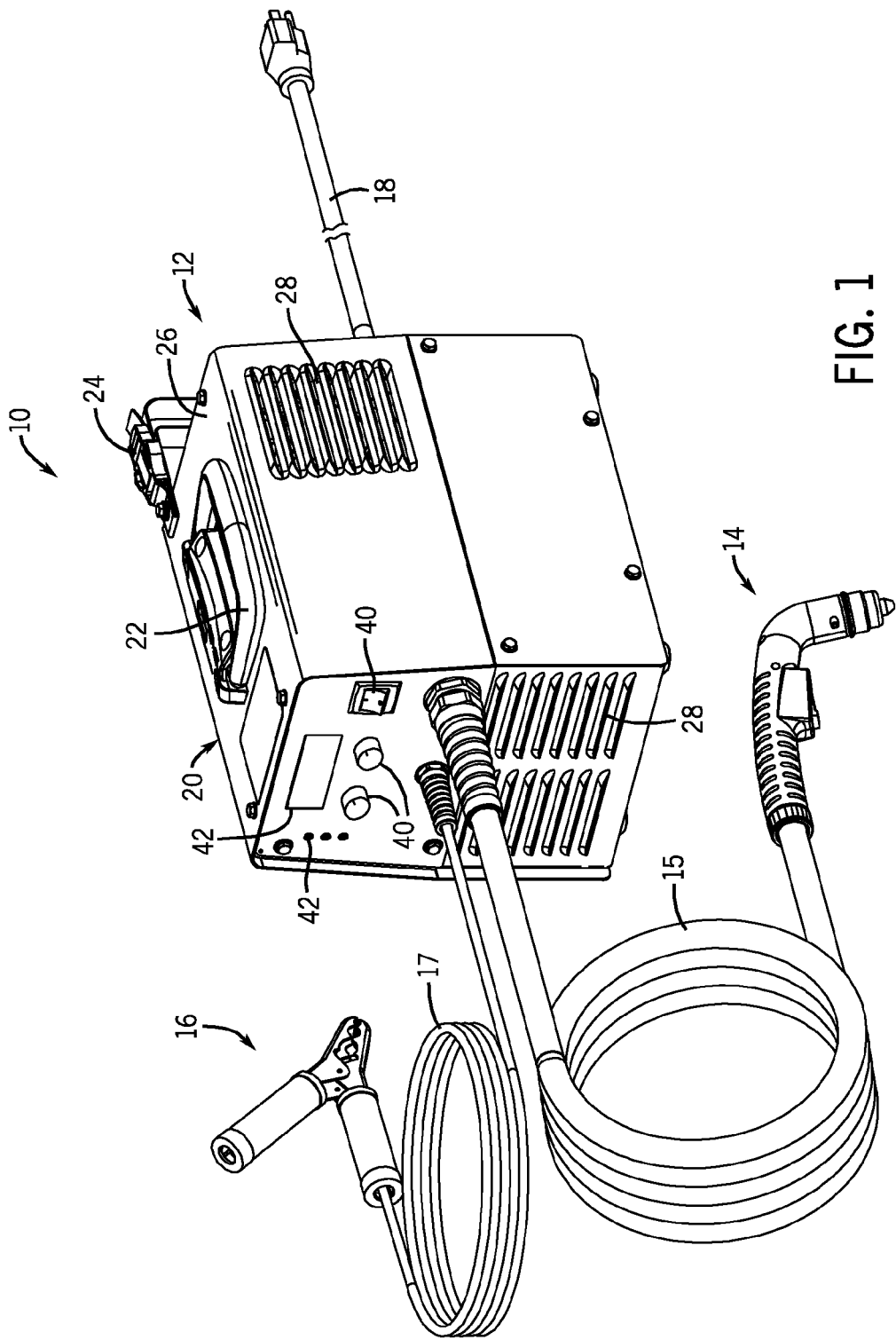
FIG. 1 is a partial perspective view of an exemplary plasma cutting system having a gas compressor in accordance with embodiments of the present invention.
Figure 2:
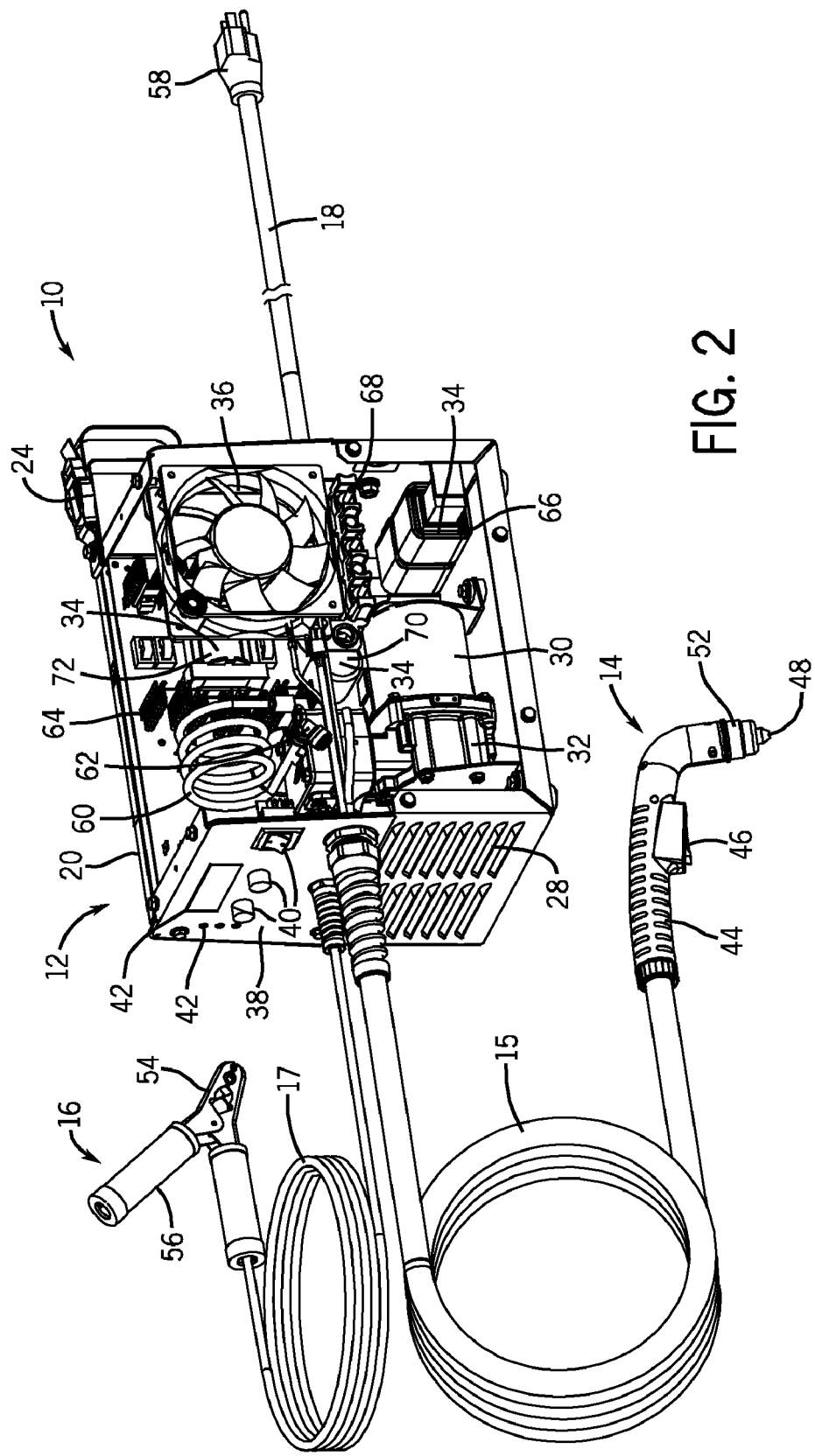
FIG. 2 is another partial perspective view of the plasma cutting system as illustrated in FIG. 1, wherein an entire side panel assembly is removed to further illustrate various internal features in accordance with embodiments of the present invention.

Referring now to the drawings, FIGS. 1 and 2 are partial perspective views illustrating an embodiment of a portable plasma cutting system 10. Specifically, FIG. 1 illustrates the system 10 with access panels completely assembled to close internal components, whereas FIG. 2 illustrates an entire side panel assembly removed to provide a better view of the internal features and components of the system 10. As discussed in further detail below, embodiments of the system 10 include various sensors configured to monitor environmental conditions, behavior of the system 10 resulting from environmental conditions, or a combination thereof. For example, the environmental conditions may include altitude (e.g., height relative to sea level), atmospheric pressure, atmospheric temperature, output flow rate of a gas (e.g., compressed air), or a combination thereof. Embodiments of the system 10 also include various controls, such as hardware control circuitry and/or software control logic disposed on memory, configured to adjust aspects of the system 10 in response to the sensed feedback. The system 10 may adjust the output flow rate or pressure of the gas (e.g., compressed air) to ensure an appropriate amount of gas for creating a plasma sufficient for cutting applications. For example, the system 10 may increase the output flow rate or pressure of gas (e.g., compressed air) in response to a high altitude, a low atmospheric pressure, a high atmospheric temperature, a low output flow rate, low output pressure, or a combination thereof. In contrast, the system 10 may decrease the output flow rate or pressure of gas (e.g., compressed air) in response to a low altitude, a high atmospheric pressure, a low atmospheric temperature, a high output flow rate, high output pressure, or a combination thereof. In some embodiments, the system 10 may adjust the current and/or voltage output settings in response to the environmental conditions.

The illustrated plasma cutting system 10 includes a torch power unit 12 coupled to a plasma torch 14 and a work piece clamp 16 via a torch cable 15 and a work piece cable 17, respectively. The torch power unit 12 may be coupled to a power source (e.g., a power grid or a motor-driven generator) via a power cable 18. The power source may provide a pilot current to a cathode, such as a movable electrode, and to the anode, such as the nozzle of the torch 14, that are forced into contact via a spring. After electrical current begins to flow from the electrode to the nozzle of the torch 14, gas or air supplied to the torch 14 counteracts the spring force and moves the electrode away from the nozzle. This breaks the electrical contact between the electrode and the nozzle and creates the pilot arc. Also, as the electrode moves away from the nozzle, it opens a nozzle orifice (connected to the air supply), and a plasma jet is created. The plasma jet causes the arc to transfer (at least in part) to the work piece held by the clamp 16, thus initiating cutting. Electronics in the power source sense when the arc has transferred and then supply a main cutting current of greater amperage after the transfer has occurred. Also, the tip of the torch 14 is disconnected (electrically), interrupting the pilot current path. Thus, the current is used to cut the workpiece, and follows a path including the positive terminal, the workpiece and the electrode. For example, the power unit 12 may be configured to supply a suitable voltage and current to create an electrical circuit from the unit 12, along the cable 15 to the torch 14, across a gap between the torch 14 and a work piece (e.g., as an electrical arc), through the work piece to the clamp 16, through the cable 17 back to the unit 12. In alternate embodiments, a non-moving electrode torch may be used in which a pilot arc is created via a high voltage and/or high frequency circuit, so that the high voltage may cause the arc to jump from the non-moving electrode to the nozzle. In yet other embodiments, any suitable torch and starting technique may be used.

The power unit 12 includes an enclosure 20 defining a generally closed volume to support various circuits, sensor features, control features, and gas supply features (e.g., air compressor). As discussed in detail below, the illustrated system 10 includes a variety of features to improve portability, serviceability, reliability, and control of the plasma torch 14 and the components within the single enclosure 20 of the system 10. For example, the system 10 may include sensors and controls to adjust the power unit 10 to account for environmental conditions, e.g., altitude, temperature, pressure, humidity, and so forth. The illustrated system 10 also may include a handle 22 on the top side of the enclosure 20 to enable easier transportation of the system 10. The illustrated system 10 also may include a latching mechanism 24 that secures the torch 14, the cable 17, the clamp 16, and/or the power 18. The latching mechanism 24 may be unlatched or removed to enable removal of the top portion 26 of the enclosure and provide access to the internal components. The enclosure 20 may also include vents 28 to relieve heat and/or pressure inside the system 10. Additional vents may be located on other panels of the enclosure 20.

To provide for operation of the plasma torch 14, the system 10 may include a compressor motor 30, such as a DC or AC motor that may include brushed, brushless, switched, reluctance, or any other suitable type of motor, and a compressor 32. For example, the compressor 32 may include a positive displacement compressor, such as reciprocating compressor (e.g., piston-cylinder), a rotary screw compressor (e.g., helical screws to compress a gas continuously without a storage tank), a diaphragm compressor, or the like. In certain embodiments, the system 10 may include a flow or pressure meter or like sensor configured to monitor output of the compressor 32. The system 10 also may include environmental sensors, such as a pressure sensor, a temperature sensor, an altimeter, a humidity sensor, or a combination thereof, to provide feedback used to adjust the motor 30, the compressor 32, power electronics 34, or a combination thereof. The power electronics 34 may be configured to condition and provide power to the torch 14 and the compressor 32, and may include transformers, circuit boards, and/or other components. A fan 36 may also be included inside the system 10 to provide air circulation and cooling to the system 10. Additionally, as depicted in FIG. 2, the fan 36 may be located next to one of the vents 28 to optimize air circulation. Additional fans 36 may be included at other locations inside or outside the enclosure 20.

In the illustrated system 10, a control panel 38 is included at an end of the power unit 12. The control panel 38 may include various control inputs, indicators, displays, electrical outputs, air outputs, and so forth. In an embodiment, a user input 40 may include a button, knob, or switch configured to enable selection of a mode of operation (e.g., plasma cut, weld, etc.), power on/off, an output current level, gas (e.g., air) flow rate, gas (e.g., air) pressure, gas type, a work piece type, a control type (e.g., manual or automatic feedback control), or a combination thereof. The control panel 34 may also include various indicators 42 to provide feedback to the user. For example, the indicators 42 may include one or more light emitting diodes (LED) and/or liquid crystal displays (LCD) to display on/off status, current level, voltage level, gas (e.g., air) pressure, gas (e.g., air) flow, environmental conditions (e.g., altitude, temperature, pressure, etc.), or any other parameter. Additionally, the indicators 42 may include an LED or LCD that displays a trouble or warning indicator if there is a problem with the system 10. Embodiments of the control panel 38 may include any number inputs and outputs, such as welding methods, air compressor settings, oil pressure, oil temperature, and system power.

Further, the user inputs 40 and indicators 42 may be electrically coupled to control circuitry and enable a user to set and monitor various parameters of the system 10. For example, the indicators 42 may display environmental conditions (e.g., altitude, temperature, pressure, etc.) that prompt a user to manually adjust the current, gas flow rate, gas pressure, or other operational parameters, or a combination thereof. The indicators 42 also may prompt a user to enable the system to perform automatic adjustments in view of the sensed environmental conditions. For example, one of the inputs 40 may enable a user to select an automatic feedback control mode based on environmental conditions and/or sensed parameters of the system 10 (e.g., compressor output).

The plasma torch 14 includes a handle 44, a locking trigger 46, a tip 48, a retaining cap 52, as well as an electrode inside the torch 14. The clamp 16 comprises an electrically conductive material clamping portion 54 having insulated handles 56. The power cable 18 includes a plug 58 for connection to a power source such as a wall socket or a motor-driven generator. The plug 58 may be configured to work with a variety of sockets or outlets, and the system 10 may receive different power sources, such as AC 50/60 Hz, 400 Hz, single or three phase 120V, 230V, 400V, 460V, 575V, etc.

Turning now in more detail to FIG. 2, the system 10 includes the fan 36, the gas compressor 32, a heat exchanger 60, pneumatic coupling 62, and heat sinks 64. Additionally, the system 10 includes ground fault circuit interrupt (GFCI) dual inductor 66, primary terminal block 68, bus capacitor 70, and transformer 72. Additionally, the system 10 may include additional inductors, terminals, capacitors, transformers, or other electrical components and is not limited to the components illustrated in FIGS. 1-2.

As mentioned above, the gas compressor 32 may be a reciprocating compressor (e.g., piston-type compressor), a diaphragm compressor, a rotary screw compressor, or the like. In the illustrated embodiment, the gas compressor 32 is a single stage reciprocating compressor. The compressor 32 may include or may be connected to the DC or AC motor 30 that is connected to power electronics 34 inside the system 10 and that drives the compressor 32. The gas compressor 32 may be rigidly mounted inside the enclosure 20 using compressor mounts such as rubber mounts, plastic mounts, metal mounts, or any other material. The compressor mounts may be configured to dampen vibrations of the compressor or to allow slight movement of the compressor during operation.

In the illustrated embodiment, the gas compressor 32 intakes and compresses air directly from the atmosphere, such as via a filter, and may use one of the vents 28 as an intake vent to enable air to flow into the compressor 32. The gas used by the compressor 32 may be a gas, such as nitrogen, argon, hydrogen, oxygen, or any combination thereof. Accordingly, the gas compressor 32 may provide a direct supply of compressed gas (e.g., air) on-demand to a desired application, such as the plasma torch 14. Thus, the torch 14 may consume air directly from the unit 12 without the air being compressed into a tank. However, alternative embodiments may include an air tank configured to store the compressed air.

To ensure reliability and performance for the system 10, various temperature sensors (e.g., thermistors) may be included inside the enclosure 20 to measure the temperature of various components. For example, the system 10 may include a temperature sensor configured to measure the temperature of the motor 30, the compressor 32, the power electronics 34, atmospheric air, and so forth. In addition to each temperature sensor, the system 10 may include control and/or monitoring logic to receive signals from the temperature sensors and perform the appropriate action or indication. For example, if the signal from one or more of the temperature sensors (e.g., thermistors) exceeds a threshold temperature or voltage for a component, then the control and monitoring logic may provide a visual warning by activating a LED or LCD 42 on the control panel 38. If the signal from a temperature sensor (e.g., thermistor) exceeds another threshold temperature or voltage and/or the signal remains above the threshold for a specific duration, then the control and monitoring logic may shutdown the system 10 or that component. The control and monitoring logic may prevent use of the system 10 until the signals from the temperature sensors fall below the threshold levels.

In addition, the temperature sensors may be used to provide feedback pertaining to the environmental conditions, e.g., a hot environment or a cold environment. As mentioned above, the temperature feedback may be used by the system 10 to adjust various parameters of the system 10 to ensure desired performance of the torch 14. For example, the system 10 may adjust output flow and/or pressure of the compressor 32, current and/or voltage to the torch 14, and other parameters.

The system 10 may include cooling components such as the heat sinks 64 and may include active cooling via the fan 36. The heat sinks 64 may be mounted such that airflow from the fan 36 circulates air around the heat sinks, further enhancing the cooling capability of the heat sinks 64. As discussed above, additional fans may be included in other locations in the system 10. Similarly, additional heat sinks may be placed inside the system 10 depending on those areas that need passive cooling and/or cannot be cooled by any of the fans in the system 10. Thus, in other embodiments, the system 10 may include any number and combination of active and passive cooling components.

The system 10 may also include control circuitry to coordinate functions of the system components. For example, the system 10 may include control circuitry in the vicinity of the control panel 34. In one embodiment, the control circuitry may include a processor, memory, and software code configured to control and or coordinate operation of the system 10. For example, the system 10 may include environmental feedback controls configured to adjust operational parameters based on temperature and/or pressure of the environment as well as operational parameters of the system components.

During operation of the system 10, a user first connects the system to a power source via the power cable 18 and the plug 58. A user may then turn on the system 10 via the user input 40. The compressor 32, fan 36, and other components of the system 12 receive power from the power electronics 34 and begin operation after the user input is activated. A user then attaches the clamp 16 to a work piece (e.g., metal or other material) to be cut. To begin cutting the work piece, the user places the cutting torch 14 adjacent the work piece and activates the trigger 46, which may involve raising a locking mechanism to free the trigger 46 before depressing the trigger 46. Compressed gas from the gas compressor 32 passes through the heat exchanger 60 and through the torch cable 15 and out the tip 48 of the torch 14. As discussed above, a pilot current may be supplied between a moveable electrode and the nozzle of the torch 14, thus establishing a pilot arc when the moveable electrode is pushed away from the nozzle of the torch 14 by the gas supplied by the compressor 32. As the electrode moves away from the nozzle of the torch, gas flowing through the torch 14 is energized into a plasma jet which in turn transfers the arc to the work piece.

The electrical arc heats up the gas from the compressor 32, converting it to plasma that is hot enough to cut the work piece. As the user moves the torch 14 across the work piece by dragging, using a drag shield, standoff guide, or the like, the material is cut as the plasma moves through the material. The thickness of the material being cut may be limited by the power of the system 10, the output of the compressor 32, and the torch 14. In addition to supplying the plasma, the compressed gas from the compressor 32 cools the torch 14 and blows away molten material (e.g., molten metal). At the end of the cut, the user releases the trigger 46 of the torch 14. Gas may continue to flow through the torch 14 for a period of time sufficient to cool the consumables, in a state known as "postflow." The postflow cools the torch 14 and ensures that any remaining material is blown away.

To provide the critical functions of the cutting process, such as providing plasma and providing a stable arc, cooling the torch, and blowing away material, the compressor 32 supplies the torch with a minimum amount of pressure and gas (e.g., air) flow rate. For example, in one embodiment, the torch 14 may receive about 70 psi and about 6 cfm of air flow. It should be appreciated that pressure and air flow rate are directly correlated. If the pressure generated by the compressor 32 decreases, for example, the air flow rate supplied by the compressor 32 may also decrease. Decreases in pressure and gas flow rate may affect the cutting process. For example, if the gas flow rate decreases, then cutting speed may also decrease, as plasma may be generated at a lower rate, and the user may move the torch 14 slower to cut a given thickness of metal. Additionally, a reduced flow rate also impacts the cooling rate of the torch 14, and may eventually lead to overheating of the torch 14. The overheating effect may be compounded by the increase in molten metal or other material that is not blown away as quickly due to the reduced flow rate. Over time, the reduced cooling may shorten the life of the consumable components of the torch 14.

As discussed above, the portability of the plasma cutting system 10 allows the system 10 to be moved to different areas. In some cases, the location of the system 10 may be in a high-altitude area, e.g., above sea level. In these locations, the atmospheric pressure (also referred to as barometric pressure) is much lower than the atmospheric pressure at sea level. For example, at sea level, i.e., 0 feet elevation, the typical atmospheric pressure is about 14.7 psi. At about 5000 feet above sea level, the atmospheric pressure is reduced to about 12.23 psi. Additionally, for a given temperature, the air is less dense at higher elevations as a result of the lower atmospheric pressures, thus reducing the mass of air in a given volume.

The lower atmospheric pressures in the elevated locations may negatively affect compressor performance, and ultimately, performance of the torch 14. For example, at about 5200 feet above sea level, the compressor output may be reduced by 25-30%. As discussed above, if the compressor output is reduced, this reduction may negatively affect cutting performance, cooling of the torch 14, and so forth.

Figure 3:
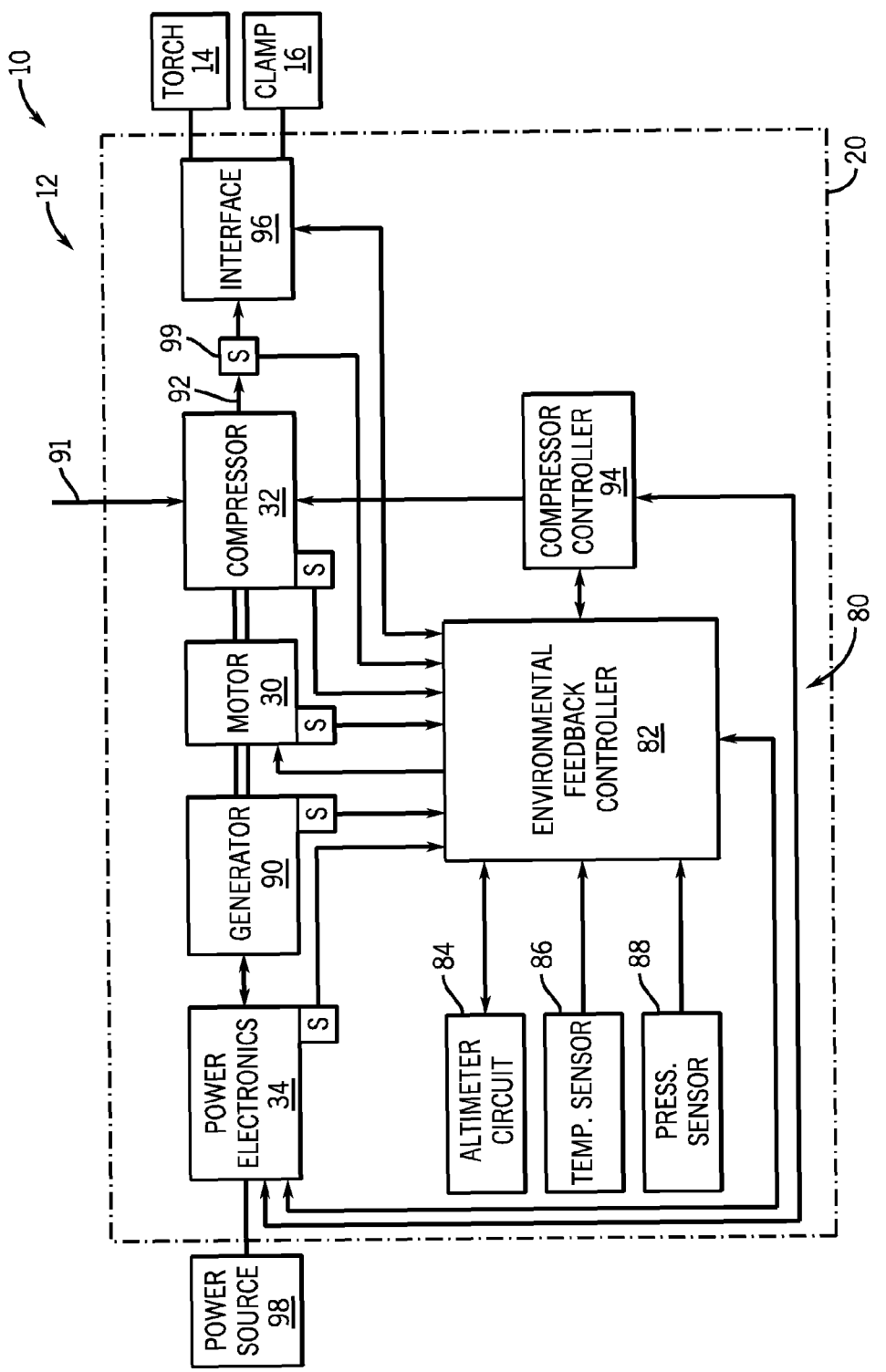
FIG. 3 is a block diagram of a feedback loop and automatic adjustment system in a plasma cutting system in accordance with an embodiment of the present invention.

FIG. 3 is a block diagram of a feedback loop and automatic adjustment system 80 in the plasma cutting system 10 in accordance with an embodiment of the present invention. In the embodiment of FIG. 3, the automatic adjustment system 80 includes an environmental feedback controller 82, a plurality of sensors indicated by "S", an altimeter circuit 84, an environmental temperature sensor 86, an atmospheric pressure sensor 88, and various feedback and control lines extending between the various components and the system 80.

In the illustrated embodiment, the sensors, S, provide feedback to the environmental feedback controller 82 from the motor 30, the compressor 32, the power electronics 34, a power generator 90, compressed air output 92, and possibly many other sensors, S. Thus, these sensors, S, may monitor the component temperature, output, and other operational parameters that may affect the performance of the power unit 12. For example, the sensors, S, may monitor electrical output (e.g., current and voltage) and temperature of the generator 90. The sensors, S, may monitor air pressure, air flow rate, temperature, and pressure of air entering 91 and leaving 92 the compressor 32. The sensors, S, also may monitor temperature of the other components.

The altimeter circuit 84 is configured to provide an indication of altitude based on sensed parameters, which may include atmospheric pressure, flow rate of the compressor 32, pressure output of the compressor 32, or other suitable criteria. Accordingly, the altimeter circuit 84 may receive feedback from the pressure sensor 88 and/or the sensor, S, measuring the compressed air output 82. The temperature and pressure sensors 86 and 88 also provide an indication of the environmental conditions, e.g., atmospheric temperature and pressure. In some embodiments, the system 80 may include a humidity sensor or other suitable environmental condition sensors.

The monitored conditions may be representative of an environmental condition, e.g., hot or cold, high or low altitude, high or low humidity, and so forth. The monitored conditions also may be representative of system health, e.g., normal or overheating. All of these monitored conditions may enable the controller 82 to adjust the operation of components to achieve a desired output (e.g., sufficient power, air pressure, and air flow rate) to produce plasma suitable for plasma cutting. The power unit 12 and controller 82 also may be configured to adjust operation of components to achieve a desired output for welding, operation of power tools, or other applications.

These sensors, S, the altimeter circuit 84, the temperature sensor 86, and the pressure sensor 88 also may provide feedback to a compressor controller 94, the power electronics 34, and a user interface/control panel 96 communicatively coupled to the environmental feedback controller 82. As discussed in further detail below, the environmental feedback controller 82 is configured to provide automatic control of various system components, e.g., compressor 32, in response to environmental conditions (e.g., altitude, atmospheric pressure, environmental temperature, etc.), component conditions (e.g., temperature), output levels (e.g., air output, power output, etc.), and so forth. The controller 82 also may display monitored conditions on the interface 96, such that a user can manually control the power unit 12 based on such conditions.

The illustrated system 10 may be connected to a power source 98, such as a power grid or a power generator. The compressor 32 is driven by the motor 30, which is controlled by the compressor controller 94. As discussed above, the motor 30 may be an electric motor, such as a DC or AC motor that may include brushed, brushless, switched, reluctance, or any other suitable type of motor, or a gas combustion engine. For example, the motor 30 may include a two-stroke or four-stroke spark-ignition engine, which includes one or more reciprocating piston in cylinder assemblies, a carburetor or fuel injection system, and so forth. Some embodiments of the system 10 may include the power generator 90 built-in or integrally disposed within the enclosure 20 of the power unit 12. Thus, the motor 30 may drive both the compressor 32 and the electrical generator 90, thereby making the power unit 12 completely portable for use in remote locations. However, other embodiments may exclude the generator 90 to reduce the size, weight, and cost of the power unit 12. Additionally, power electronics 34 provide the power management functions for the system 10. In some embodiments, the power electronics 34 include a plasma cutting circuit, a welding circuit, an induction heating circuit, a power conditioning circuit, a user input/interface circuit, a power generator circuit (e.g., if the unit 12 includes the generator 90), the environmental feedback controller 82, or a combination thereof.

In certain embodiments, the automatic adjustment system 80 increases compressor output in response to any decrease in compressor output 92 caused by conditions such as low atmospheric pressure. To automatically adjust the compressor 32, the controller 82, the altimeter circuit 84, and/or the controller 94 may receive feedback from sensor 99 to evaluate whether or not the compressed air output 92 is sufficient for the present application, e.g., plasma cutting. The sensor 99 may be a pressure sensor and/or flow rate sensor. Additionally or alternatively, feedback from the other sensors, S, the altimeter circuit 84, the temperature sensor 86, and/or the pressure sensor 88 may be used to evaluate the environmental conditions and/or operating conditions of the power unit 12. In response to these monitored conditions, the controller 82 may provide a control signal to adjust one or more components, e.g., power level of motor 30. Accordingly, the control signal may provide more power if the motor 30 is electric, more fuel injection if the motor 30 is a gas combustion engine, and so forth. Alternatively, any other metric that is indicative of compressor output may be measured. Additional embodiments may measure pressure, flow rate, and/or any other metric in any combination. In one embodiment, the sensor 99 may be located immediately after the exhaust of the compressor 32.

Additionally, in other embodiments, feedback from the sensors 99, the temperature sensor 86, and the other sensors S may be used to indicate to the user that there may be a malfunction in the system 10. For example, if all the sensors read within normal parameters, but the output of the compressor 32 is still inadequate (e.g. too low), the system 10 should indicate that there may be a malfunction with either the compressor 32 or the sensor 99 or other sensors S. Similarly, any other component's output or other operating parameters may be monitored and the appropriate indicator provided.

The environmental feedback controller 82, the altimeter circuit 84, the compressor controller 94, or a combination thereof (e.g., a single circuit), may include a processor and memory to process the signals received from the sensors, store processing algorithms, store a history of the received signals and/or store operating parameters of the torch 14 and compressor 32. Again, the controller 82 and/or the altimeter circuit 84 uses the signals received from the sensor 99 to determine the reduction in compressor output. If the compressor output is below the desired level for the torch 14, the controller 82 and/or the altimeter circuit 84 controls the compressor motor speed to increase the compressor output. The controller 82 and/or the altimeter circuit 84 sends a signal to the compressor controller 94, which in turn overdrives the DC motor 30 driving the compressor 32. The overdriven DC motor 30 increases the speed of the compressor 32, thus increasing the compressor output and proving the torch 14 with the necessary pressure and flow rate. In some embodiments, the DC motor 30 may be overdriven up to 30%. Although many of the examples correspond to a high altitude and low atmospheric pressure environment, the system 80 may similarly adjust the power unit 12 to account for low altitude, high atmospheric pressure, variations in humidity, variations in temperature, and so forth.

Additionally, to ensure smooth adjustment of the compressor, the controller 82 and/or the altimeter circuit 84 may smooth out the sampling rate of the signals received from the sensors, e.g., sensor 99. For example, if the sampling rate is too high for the sensor 99, then the feedback loop may be "oversampling" the changes in pressure and changes from the compressor controller 94 to the motor 30 may oscillate or fluctuate too rapidly. The controller 82 and/or the altimeter circuit 84 may decrease the sampling rate to smooth out the sampled signals according to a preprogrammed metric. Additionally, the controller 82 and/or the altimeter circuit 84 may increase the sampling rate if the compressor output (or another feedback signal) is not changing quickly enough or is dropping unexpectedly. In one embodiment, the sampling rate of the sensor 99 may be about 2 ms. The other sensors may have similar sampling rates.

In addition to automatically adjusting the compressor 32 for changes in altitude and atmospheric pressure, the feedback loop and automatic adjustment system 80 may also adjust the compressor 32 during transient conditions, such as start-up or post flow. For example, during these transient conditions, the DC motor 30 may oscillate too quickly as the normal compressor output 92 is restored. In these transient conditions, the system 80 can minimize oscillations through adjustments to the compressor controller 94 and DC motor 30. These adjustments may be further improved by the sampling rate logic described above.

Figure 4:
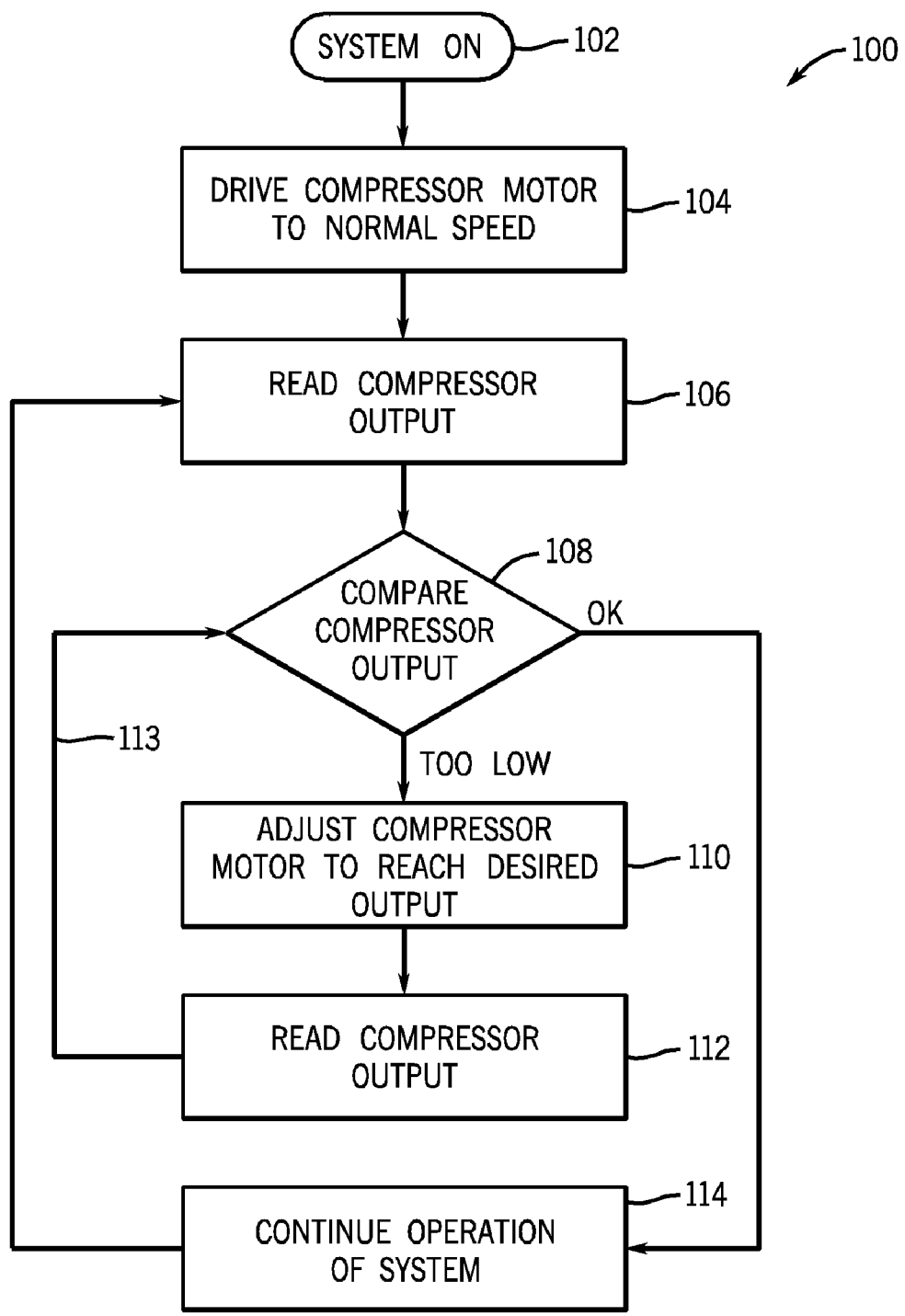
FIG. 4 is a flowchart of operation of the feedback loop and automatic adjustment of a plasma cutting system in accordance with an embodiment of the present invention.

FIG. 4 is a flowchart depicting an automatic compressor adjustment process 100 during operation of a plasma cutting system 10. Beginning in block 102, the system 10 is turned on, such as by an operator activating a user input 40 on the control panel 38 of system 10 as depicted in FIGS. 1-2. After the system is turned on, the compressor motor 30, and thus the compressor 32, is driven to reach the "normal" operating speed (block 104). For example, the normal operating speed may be set to produce a minimum compressor output for a specific torch 14 at sea level. After the compressor motor 30 has reached the normal operating speed, the sensor 99 may begin sampling the output of the compressor 32 (block 106). As discussed above, the sensor 99 may read the output pressure of the compressor, output flow rate, any other metric indicative of compressor output, or any combination thereof.

The output of the compressor 32 is compared to the desired compressor output suitable to drive the torch 14 (block 108). If the compressor output is sufficient, then no adjustment is needed, and the system 10 may continue normal operation (block 114) with continued sampling by the sensor 99 to ensure changes in compressor output occur. If the compressor output is not at the desired levels (e.g., below the minimum pressure and/or flow rate) for the torch 14, then the process 100 may begin automatic adjustment of the compressor 32. As discussed above, this may occur as the portable plasma cutter system 10 is used in a high-altitude location, i.e., a region of low atmospheric pressure that reduces compressor output for a given motor speed.

As discussed above, to increase the output of the compressor 32, the motor 30 is overdriven to increase the speed of the motor 30 (block 110). In some embodiments, the compressor controller 94 may include a threshold motor speed such that the motor 30 is not overdriven beyond the threshold speed. The threshold speed may be set to ensure safety, reliability, and service life of the motor 30 and/or compressor 32. In addition, overdriving the motor 30 and increasing the output of the compressor 32 may result in greater heat produced inside the system 10, thus increasing the desire for more heat dissipation and cooling to maintain safe operating temperatures. As a result, regulation of the heat produced by the components of the system 10 may also be a factor in determining a threshold speed of the motor 30.

The sensor 99 continues to sample the compressor output 92 (block 112). Using loop 113, the output of the compressor 32 is again compared to the desired (e.g., minimum) output for the torch 14 (block 108). If the compressor output remains too low, then the process 100 continues to adjust (e.g., overdrive) the motor 30 (block 110) until the desired output is met. The process 100 may also include a threshold duration of time that limits the execution of feedback loop 113. For example, in one embodiment, if the compressor output does not reach the desired (e.g., minimum) output after 120 seconds, then the feedback loop 113 and adjustment of the compressor 32 may be disabled. If the compressor output 92 achieves a sufficient level, then the system 10 may continue operation (block 114), as sufficient pressure and flow rate will be supplied to the torch 14.

It should be appreciated that the feedback loop and automatic adjustment of a compressor are applicable to other portable systems using a gas compressor. For example, an engine-driven welding system that includes an engine, generator, and gas compressor may also implement a feedback loop and automatic adjustment mechanism using the sensor and logic described herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
 a power unit, comprising:
  an enclosure;
  a compressor coupled to the enclosure;
  circuitry coupled to the enclosure, wherein the circuitry comprises at least one of a plasma cutting circuit, a welding circuit, or an induction heating circuit;
  at least one sensor coupled to the enclosure, wherein the at least one sensor is configured to obtain sensor feedback indicative of a change in altitude, wherein the sensor feedback comprises at least one of a compressor output, an altitude, or an atmospheric pressure; and
  a controller having instructions to adjust output of the compressor to maintain the output above a threshold output in response to the sensor feedback at a plurality of different altitudes while the power unit is at ground level.

2. The system of claim 1, wherein the controller has instructions to maintain the output above the threshold output to maintain a performance level of at least one of plasma cutting with the plasma cutting circuit, welding with the welding circuit, or inducting heating with the inducting heating circuit.

3. The system of claim 1, wherein the circuitry comprises the plasma cutting circuit, and the controller has instructions to maintain the output above the threshold output to maintain a performance level of plasma cutting with the plasma cutting circuit.

4. The system of claim 1, wherein the at least one sensor comprises an altimeter or an atmospheric pressure sensor.

5. The system of claim 1, wherein the at least one sensor comprises at least one of a compressor pressure sensor or a compressor flow rate sensor coupled to the controller.

6. The system of claim 1, wherein the torch power unit comprises the plasma cutting circuit.

7. The system of claim 1, wherein the power unit comprises at least one of the welding circuit or the induction heating circuit.

8. The system of claim 1, wherein the power unit comprises a power generator.

9. The system of claim 1, wherein the controller is configured to adjust output of the compressor to maintain cooling above a threshold level using the output.

10. The system of claim 1, wherein the controller is configured to provide a notification to a user based on the sensor feedback.

11. A method, comprising:
    obtaining sensor feedback indicative of a change in altitude of a power unit, wherein the power unit comprises a compressor and circuitry each coupled to an enclosure, wherein the circuitry comprises at least one of a plasma cutting circuit, a welding circuit, or an induction heating circuit; and
    adjusting output of the compressor of the power unit to maintain the output above a threshold output in response to the sensor feedback at a plurality of different altitudes while the power unit is at ground level.

12. The method of claim 11, wherein obtaining the sensor feedback comprises monitoring at least one of altitude or atmospheric pressure.

13. The method of claim 11, wherein obtaining the sensor feedback comprises monitoring environmental temperature.

14. The method of claim 11, wherein obtaining the sensor feedback comprises monitoring environmental humidity.

15. The method of claim 11, wherein adjusting output of the compressor comprises adjusting a motor speed of the compressor.

16. The method of claim 11, wherein obtaining the sensor feedback comprises monitoring the output of the compressor.

17. The method of claim 11, comprising maintaining the output above the threshold output to maintain a performance level of at least one of plasma cutting with the plasma cutting circuit, welding with the welding circuit, or inducting heating with the inducting heating circuit.

18. The method of claim 11, wherein adjusting the output of the compressor comprises adjusting outputs of the power unit to maintain levels of current and gas flow above threshold levels to generate plasma.

19. The method of claim 11, wherein adjusting the output of the compressor comprises adjusting cooling using the output of the compressor.

20. A system, comprising:
    a torch power unit, comprising:
        a plasma cutting circuit;
        a compressor;
        a motor coupled to the compressor;
        an interface comprising a plasma torch connection, wherein the interface is coupled to the plasma cutting circuit and the compressor; and
        an environmental feedback controller configured to adjust power output, or compressor output, or a combination thereof, to levels effective to generate plasma in different environmental conditions, wherein the different environmental conditions comprise a plurality of different altitudes of the power unit.

21. The system of claim 20, wherein the environmental feedback controller comprises an altimeter, an atmospheric pressure sensor, or a combination thereof.

22. The system of claim 20, wherein the plurality of altitudes are at ground level.

* * * * *